United States Patent [19]

Drogichen

[11] 4,218,757
[45] Aug. 19, 1980

[54] DEVICE FOR AUTOMATIC MODIFICATION OF ROM CONTENTS BY A SYSTEM SELECTED VARIABLE

[75] Inventor: Daniel P. Drogichen, West Chester, Pa.

[73] Assignee: Burroughs Corporation, Detroit, Mich.

[21] Appl. No.: 920,557

[22] Filed: Jun. 29, 1978

[51] Int. Cl.² .................... G06F 13/00; G06F 9/20
[52] U.S. Cl. ............................................. 364/900
[58] Field of Search ... 364/900 MS File, 200 MS File; 365/94

[56] References Cited

U.S. PATENT DOCUMENTS

| | | | |
|---|---|---|---|
| 3,299,261 | 1/1967 | Steigerwalt, Jr. | 364/900 |
| 3,303,477 | 2/1967 | Voigt | 364/200 |
| 3,573,851 | 4/1971 | Watson et al. | 364/200 |
| 3,634,883 | 1/1972 | Kreidermacher | 364/200 |
| 3,778,776 | 12/1973 | Hakozaki | 364/200 |
| 3,949,378 | 4/1976 | Crabb et al. | 364/200 |
| 3,959,783 | 5/1976 | Fressineau et al. | 365/94 |
| 4,047,249 | 9/1977 | Stanley et al. | 364/200 |
| 4,054,951 | 10/1977 | Jackson et al. | 364/900 |
| 4,085,439 | 4/1978 | Minnick | 364/200 |
| 4,138,738 | 2/1979 | Drogichen | 365/94 |

Primary Examiner—Gareth D. Shaw
Assistant Examiner—E. Chan
Attorney, Agent, or Firm—Mark T. Starr

[57] ABSTRACT

A device for use with a digital computer for storing standard software used by the computer and modifying the address portions of the standard software prior to transmission to the computer. The device includes a ROM package containing a ROM within which is stored a standard software subprogram written assuming it is stored at an absolute location in the computer's memory other than its actual location in the computer's memory system. Also included in the ROM package is a base register which can be loaded, under control of the operating system software, with an offset value reflecting the difference between the actual starting memory system location of the subprogram stored in the ROM and the assumed absolute starting location of the subprogram. Each ROM word includes an extra bit to indicate whether the corresponding data word contains an address requiring relocation. As a word is read out of ROM, a gating circuit tests whether an address relocation is required. If the test is positive, the gating circuit gates the value in the base register into one input of an adder located on the ROM package, the other input to the adder coming from the data word read out of the ROM. The resulting modified data word outputted from the adder is sent to the computer. If the ROM output does not indicate that a relocation is required, the gating circuit provides a zero input to the adder so that the adder output reflects the unmodified input from the ROM.

3 Claims, 3 Drawing Figures

DEVICE FOR AUTOMATIC MODIFICATION OF ROM CONTENTS BY A SYSTEM SELECTED VARIABLE

BACKGROUND OF THE INVENTION

The cost of microprocessors has dropped drastically due to the benefits of mass production. Contrary to the drop in the cost of microprocessor hardware, the cost of software to support these microprocessors has risen. This inconsistency in the cost of implementing microprocessor controlled apparatuses has hampered their proliferation.

One major reason for the high cost of microprocessor software stems from the fact that programming methods previously used with large computers are now being used in microprocessors. As an example, consider the system where portions of assemblers and compilers are loaded into read/write memory from an input/output device. Next, source language is read from one device while partly processed output is written on another. Subroutines are then read in from another device and addresses are relocated so that all code required to run a job fits together in memory with no wasted words between.

Although the latter approach to programming made sense in the early days of computers when memory was prohibitively expensive, memory costs have dropped drastically with read only memory currently being the cheapest kind and available in very small capacities. In addition, microprocessors are being utilized in many direct control environments which require no writing or rereading of data. Thus, in many cases, input/output devices are only required for program development.

It is almost universally true that mass production achieves low unit cost by turning out large sums of identical products. In the case of microprocessor programs which are often implemented in read only memories (ROMs), the obvious way of carrying out mass production is to manufacture large quantities of ROMs with identical contents. The drawback to this approach lies in the prevalent method of linking various pieces of software together into a complete software system, which requires many address changes in each segment. Thus, one factor that has prevented the mass distribution of modular computer programs implemented in ROM form is that often a program instruction must known the absolute location in the memory system of another instruction in the same subprogram, for example, for branching. Therefore, if a computer manufacturer wanted to offer a catalog of subprograms in ROM form, he would have to contend with the desire of different users to select various offerings and locate the selected offerings at different actual locations in memory. It would not be feasible for the manufacturer to assign each subprogram a unique location as the total available memory locations would rapidly be exhausted. What is needed then, is a way to modify the address portion of certain of the ROM'ed instructions before they are used as addresses by the microprocessor.

One solution to the problem presented lies in the use of base registers. Base registers provide a hardware facility that relocates addresses as needed during program execution, making it unnecessary to change them within the program.

In the prior art, base registers have been designed into the microprocessor's CPU chip or added on by the system builder. The apparatus described by John A. Carroll in "Solving Mass-Produced ROM Programming Problems With Base Registers," Computer Design, August, 1977, pp. 99, proposes a base register system for solving the problem presented. The Carroll apparatus includes a set of base registers, and adder/selector circuitry located functionally between the CPU's address bus lines and the memory system address bus lines. Several bits of the CPU's address bus are used to select a base register, which is added to the remaining bits to produce the memory system address.

Although the Carroll apparatus represents an advance over the prior art, it appears to have several drawbacks. First, since it is undesirable to require the CPU to massage the address read from program memory before issuing it on its address bus, the base register select bits must be precoded into the mass produced program ROM. Since a user application will most likely require the use of several base registers, the number of which will increase with the number of subprogram modules used in the system, each of the ROMs must provide a sufficient number of bits of base-register select information to accommodate the largest foreseeable programming system and this base register address is not alterable since it is ROM'ed. Hence, the situation is similar to the original problem experienced, with the branch register address space substituted for the memory system address space. Although this drawback could be overcome by swapping the base register contents before beginning operation with a subprogram which uses that branch register, such a routine is expensive in system program overhead. Alternatively, the branch register select portion of the address could be provided by special hardware in each system, but this would defeat the objective of a mass produced system.

The second drawback of the Carroll apparatus is that the hardware required to perform the address relocation is located at or within the CPU. That is, either the branch register array and select/adder circuitry must be located on a special chip or it must be on the CPU chip, which may be the most valuable silicon real estate in the system. In the latter case, the requirement that all of the branch registers that any user might need must be sold to all users would impose a significant drain on the logic available on the CPU chip. In either case, locating the branch register array and adder/selector centrally presents additional problems in the implementation of multiprocessor systems in which multiple CPUs, each performing different tasks at any one time, share common system address buses, data buses, and program memory.

A second solution to the problem presented lies in the implementation of a "jump relative" instruction as one member of the microprocessor's instruction set. Basically, a jump relative instruction is a branch instruction with the object of the branch specifying a positive or negative number of storage words. The microprocessor adds the object of the jump relative instruction to the storage address the jump relative instruction is located at to come up with the effective address to be branched to.

The main drawback of the jump relative instruction is that since it is ROM'ed, the object of the instruction cannot be altered. Hence, if a first subprogram located in a first ROM required the use of a second subprogram located in a second ROM, the memory system address space within which the second ROM was located would have to correspond to the effective address specified by the ROM'ed jump relative instruction. This would prevent the user from choosing from a catalog of ROM contained subprograms and locating the subprograms at any available location in the microprocessor's memory system he chose.

Further, the availability of a jump relative instruction would not compensate for the other benefits associated with a base register. A base register can be used to store the location of RAM workspace the subprogram requires for storing or manipulating data. A base register may also be used for storing personality constants which preselect some subset of the subprogram's capability or for providing the addresses of input/output devices.

Additionally, since the jump relative instruction would have to be implemented on the CPU chip, the logic required to implement the instruction might cause a drain on the limited space available on the CPU chip.

It is a general object of the present invention to eliminate these and other drawbacks of the prior art by providing an improved device for relocating addresses as needed during program execution.

It is another object of the present invention to provide a device for relocating program addresses which is physically a part of the ROM package within which the program is located.

It is a further object of the present invention to provide a device for attachment to a microprocessor which allows the microprocessor user to utilize selected, mass produced, ROM contained subprograms without the need of customized software or hardware.

It is still a further object of the present invention to provide a device, the use of which will lower software costs associated with a mass produced microprocessor.

These and other objects, features and advantages of the present invention will become more apparent from the detailed description of the preferred embodiment when read in conjunction with the drawings.

SUMMARY OF THE INVENTION

According to the invention, the software utilized by the microprocessor is stored in a plurality of ROM packages connected to the microprocessor by an a-bit address bus, an n-bit bidirectional data bus and at least one control line. These ROM packages comprise the microprocessor's memory system and each is associated with a unique set of actual memory system addresses.

Each ROM package includes a $2^a \times (n+1)$ bit ROM, where $2^a$ represents the number of $(n+1)$ bit locations in the respective ROM. Each ROM package is used to store a sequence of n-bit program instructions which constitute a subprogram. Each instruction is stored in n bits of an $(n+1)$ bit word. The $(n+1)$st bit position is used to indicate whether the associated instruction contains a memory system address. Each subprogram is written assuming it is located starting at memory system address zero.

Also located in each ROM package is an n-bit base register, which is loaded under control of the operating system software with an offset address specifying the difference between the actual memory system address of the first addressable location in the associated ROM and the assumed memory system address.

When the microprocessor transmits a memory system address to the memory system, the ROM package corresponding to the specified memory system address receives the address and initiates a read cycle to its ROM. The $(n+1)$ bit word addressed is read out of the ROM. The $(n+1)$st bit read from the ROM is fed into a gating circuit contained in the ROM package. If the $(n+1)$st bit is on, the gating circuit gates the contents of the base register into one input of an n-bit adder also located in the ROM package, the second input to the adder coming from the first n bits of the $(n+1)$ bits read out of the ROM. The adder adds the offset value to the address portion of the instruction read out of the ROM. A driver circuit, located in the ROM package and connected to the adder output, transmits the relocated program instruction to the microprocessor.

In the case when the $(n+1)$st bit read from the ROM is a zero, the gating circuit is turned off and the output of the gating circuit is n-bits of all zeros. In such case, the output of the adder is identical to the other input to the adder; viz, the first n bits of the $(n+1)$ bit word read out of the ROM.

DETAILED DESCRIPTION OF THE PREFERRED EMBODIMENT

The use of standard software in computer programming serves to relieve the programmer of reprogramming a computer from scratch. Among the typical types of standard software subprograms are language translators to translate programming languages into the computer's own internal machine code, and subroutine libraries which represent sets of off-the-shelf program fragments that perform commonly required functions.

A typical subroutine includes internal jumps and external references. Before using a subroutine, a number of actual machine addresses must be inserted in the jump instructions and external references. The normal method of doing this is to read the routine into an available area in read/write memory under control of a relocation loader program which keeps track of where in memory everything is and calculates actual addresses needed in various instructions.

By putting all standard software into read only memory (ROM), many practical benefits are achieved. For instance, most of the data-juggling programming can be inside subroutines, leaving only a relatively small application oriented program to direct the whole task. Thus, most software could be selected from a catalog of standard factory programmed ROMs, and just plugged in. Using this technique, only a small portion of the system needs to be stored in custom ROM, with the majority of the system in standard mass-produced ROM.

The problem confronted in using ROMs to store standard subroutines is that nothing in the programmed ROM can be changed to make all parts of a software system fit together. At the same time however, many addresses in a program, particularly in jump instructions, assume a knowledge of where in memory each program is located. Each subroutine cannot be permanently assigned to a particular block of space since the whole catalog of software available for a particular computer would rapidly exceed the maximum amount of memory its address word could handle. Further, even if that were possible, many data manipulation subroutines must be informed each time they are called just where their data is, so that even if software can be relocated for each system and custom ROMs could be fabricated cheaply, the fact that external references change while the program is running interferes with a software solution.

The present invention employs base registers to provide a hardware method of modifying addresses at run time while leaving the programs unchanged. A base register is a hardware device that stores an address word, called a base or offset. In accordance with the present invention, the base can be added automatically to the address of an instruction or data field after the instruction is read out of memory, but before it is sent to the computer.

Figure 1:
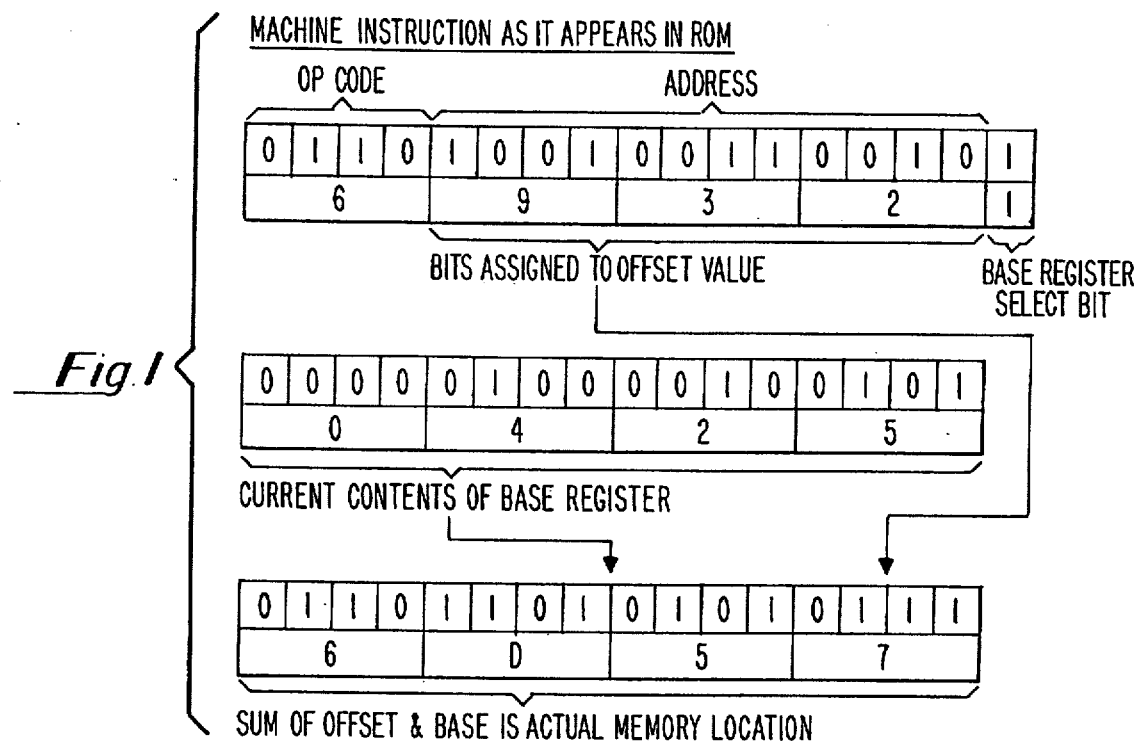
FIG. 1 is an example of the program instruction modification performed by the present invention as seen by a programmer.

FIG. 1 illustrates an example of a base register operation as seen by a programmer. The example assumes that only one base register is associated with the particular ROM. The ROM contains a 17 bit word, with the low order bit designating whether the associated 16 bit data word is to be offset by the contents of the base register. The example assumes that the data word consists of a four bit operation code "6" and a twelve bit address "932." Without a base register, when the computer accessed the ROM location illustrated, the two byte instruction "6932" would be read out of the ROM and received by the computer. However, the machine represented here has been augmented so that the base register select bit being a logical one indicates that the two byte word read from the ROM is to be offset. This being the case, the current contents of the base register, "0425," is added to the two bytes, "6932," read from the ROM and the resulting two byte instruction, "6D57," is sent to the computer. Thus, when the processor subsequently executes this instruction, the instruction will access the offset address "D57" rather than the address, "932," which was stored in the ROM.

The capability of offsetting addresses read out of ROM enables any block of code to be written as if it began at address zero, and the ROM to be wired so that the code can appear anywhere in the computer's memory system. As long as the subroutine's actual address origin is placed in the base register before execution and the program calling the subroutine knows the actual starting address of the subroutine, instructions within the program can refer to each other correctly. This method makes it possible to manufacture large numbers of ROM copies of programs, subprograms or subroutines, all alike, without knowing what address space will be assigned to them in different systems.

Figure 2:
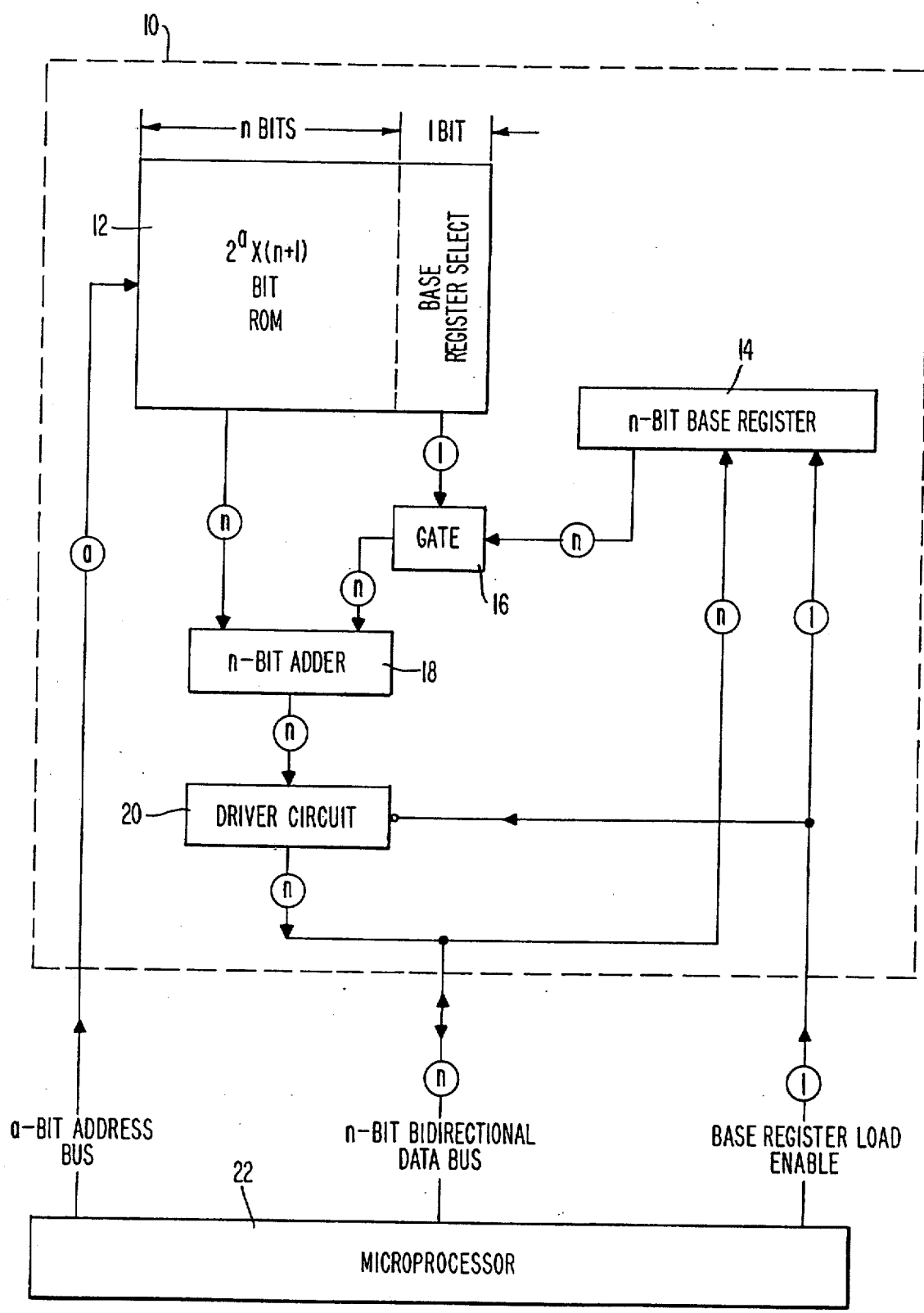
FIG. 2 is a block diagram of the preferred embodiment of the present invention connected to a microprocessor.

FIG. 2 illustrates the preferred embodiment of the present invention. The ROM package 10 includes all of the hardware necessary to automatically modify the ROM contents by the addition of an offset. The preferred embodiment is intended to be used as a part of or as the entire memory system attached to a microprocessor 22. The preferred embodiment of the present invention can be used with most commonly available microprocessors 22 whose characteristics include an n-bit instruction format, an a-bit memory address bus, an n-bit bidirectional data base and the ability to activate at least one external control line. Variations on the preferred embodiment, which will be obvious to those skilled in the art, will allow the present invention to be incorporated for use with a wide range of both microprocessors and larger computers.

The ROM 12 itself is a standard product with a word size of $n+1$, where n is the word size utilized by the microprocessor 22, and a storage capacity of $2^a$ words where $2^a$ is the number of addressable locations available with an a bit address. Thus for use with a typical microprocessor 22 having a 3-byte machine instruction, the ROM 12 word size would be 25 bits. Of these 25 bits, n (=24) bits are used to store the 3-byte machine instruction and the 25th bit is used to indicate a base register select condition, the meaning of which will be explained below. The microprocessor 22 transmits the memory system address to the ROM 12 over the a-bit address bus. The ROM 12 includes circuitry to decode the address received from the microprocessor 22, the design of this address decoding circuitry being well known to those skilled in the art.

Also located within the ROM package 10 is an n-bit base register 14, which in the latter example would be 24 bits wide. In the preferred embodiment of the present invention, the base register 14 is a static read/write memory element with a latched output. However, it will be obvious to those skilled in the art that alternate memory devices, such as a dynamic memory chip, could be utilized. The base register 14 receives the data to be stored in it over the n-bit bidirectional data bus connecting the ROM package 10 with the microprocessor 22. The data on the bidirectional data bus is stored in the base register 14 when the base register load enable input is strobed by the microprocessor 22.

The n bit output of the base register 14 is connected to gate 16, which is also located on the ROM package 10. The other input to gate 16 is from the base register select bit position of ROM 12. Gate 16 may be of a standard design such as one comprising n two legged AND circuits, with the base register select bit output of ROM 12 providing one input to each of the n AND circuits and each of the n outputs of base register 14 providing the second input to one of the n AND circuits, respectively.

The n bit output of gate 16 serves as one set of inputs to the n-bit adder 18, which is also located on the ROM package 10. The other set of inputs to the adder 18 is the n data bit outputs of ROM 12. The n-bit output of adder 18 is fed into driver circuit 20 which redrives the output of the adder 18 and transmits them onto the n-bit bidirectional data bus. This bus provides the data link between the ROM package 10 and the microprocessor 22.

The driver circuit 20 is controlled by the base register load enable signal. When the latter signal is sent by the microprocessor 22, the driver circuit 20 is put in a high impedance state which is effective to turn it off. This prevents the driver circuit 20 output from interfering with data on the n-bit bidirectional bus when the base register 14 is being loaded.

Various microprocessors 22 requiring an external memory may be utilized with the present invention. Typical of such microprocessors 22 are the Intel 8080 and the Motorola 6800. However, those skilled in the art will realize that similar embodiments of the present invention can be adapted for use with most digital computers. The requirements for the microprocessor 22 are that it address external memory over an a-bit address bus and transfer data to and from external memory on an n-bit bidirectional data bus. In addition, the selected microprocessor 22 must be capable of providing the base register load enable signal to the ROM package 10.

The following explanation describes the operation of the present invention when employed in conjunction with a microprocessor 22. it will be assumed that only one ROM package 10 is connected to the microprocessor 22 and that it contains a subprogram which will be used by the microprocessor 22. The microprocessor 22 is initially powered on and its operating system program (which is not stored in the ROM package 10) is put in control. The operating system program must then load the base register 14 with the offset (which is the actual memory system address corresponding to the first addressable location in the ROM package 10 containing the subprogram). The microprocessor 22 accomplishes this by transmitting the address or data to be stored in the base register 14 on the n-bit bidirectional bus going to ROM package 10 and activating the base register select line for ROM package 10. The microprocessor 22 software and hardware to accomplish this will be obvious to those skilled in the art. The base register load enable signal turns off driver circuit 20 so that no extraneous data is placed on the bidirectional data bus from the driver circuit 20 output. The data from the microprocessor 22 is read into the base register 14 by the base register load enable signal initiating a store operation in the base register 14.

Once the base register 14 is loaded, the operating system program or any program calling the subprogram stored in the ROM package 10 need only know the actual storage system starting address of the subroutine, this address normally being the value stored in the base register 14. The subprogram stored in the ROM package 10 is written assuming the subprogram is located starting at address 0.

The ROM 12 word size is n+1 bits where n is the instruction size used by the associated microprocessor 22. The extra base register select bit associated with each n-bit word is used to designate whether an address stored in the corresponding n bit word requires relocation. For example, if the n-bit word specifies data rather than an address, or specifies a register to register instruction, since no addresses are involved in using the data or executing the instruction, respectively, relocation normally is not necessary and the base register select bit associated with the data or instruction would be a zero. On the other hand, if the n-bit word specifies a branch within the subroutine or references the location of data within the subroutine, the address specified in the n-bit word must be relocated to reflect the actual memory system address of the object of the branch instruction or the location of the data, respectively, rather than the address stored in the ROM 12. In such case, the base register select bit associated with the corresponding n-bit word would be a one. It should be noted that the base register select bit associated with each n+1 bit ROM word is precoded in the ROM when it is burned by the manufacturer, the on/off state of each base register select bit being determined by whether the associated n-bit data word contains an address requiring relocation.

Thus, assuming the base register 14 located in ROM package 10 has been loaded by the operating system program with the offset address, the following occurs when the microprocessor 22 initiates a read operation from the ROM package 10. The microprocessor 22 sends the actual address it wants to read to the ROM package 10 over the a-bit address bus. This initiates a read to the ROM 12 location specified and n+1 bits are read out of the ROM 12. If the base register select bit (that is, the (n+1)st bit) read out of ROM 12 is a zero, then gate 16 receives a zero input from the ROM 12, the gate 16 is turned off due to the base register select bit being zero and the n-bit output of gate 16 is all zeros. Hence the n-bit adder 18 receives as inputs the high order n-bits of data read from ROM 12 and n-bits of zeros from the gate 16. The output of the n-bit adder 18 is identical to the input from ROM 12 since the second input from the gate 16 is all zeros. The n-bit output of adder 18 is inputted to driver circuit 20 where it is redriven onto the n-bit bidirectional data bus going to the microprocessor 22. Thus, in this case, the data sent to the microprocessor 22 is exactly as it was stored in ROM 12; viz., it has not been relocated.

If the base register select bit read out of the ROM 12 is a one, the following will occur. The gate 16 will be enabled due to the base register select bit being a one. With the gate 16 enabled, the clamped n-bit output of base register 14 will be gated through gate 16 and inputted to adder 18, the other input to adder 18 being the high order n-bits of data read out of ROM 12. The adder 18 will add the offset received from gate 16 to the data word read out of ROM 12. The modified n-bit data word read out of adder 18 is fed into driver 20 where it is redriven onto the n-bit bidirectional data bus going to the microprocessor 22. Thus, in this case the data sent to the microprocessor 22 contains a relocated address corresponding to an actual addressable location in ROM 12.

The apparatus as described allows a manufacturer to sell a subprogram software module in ROM package 10 form to a user, and the user is free to locate the ROM package 10 at any actual location in his memory system. No additional hardware is required in the user's system since all hardware necessary to relocate the addresses specified in the ROM 12 containing the subprogram is located within the ROM package 10 the user purchases. Further, only minimum software overhead is expended since once the user initializes the base register 14 with the offset value for his system, address relocation is performed automatically with no requirements on the part of system hardware or software.

The preferred embodiment of the present invention has only considered the case of a memory system including one ROM package 10. Obviously, a typical user would purchase a number of ROM packages containing the subprograms necessary to meet his software requirements. Since each ROM package purchased contains all of the hardware required to support the ROM package at any actual memory system address location, the hardware does not have to be customized to the user's needs and the user only need purchase the ROM packages his software needs require. Since the manufacturer can sell the identical ROM package 10 to each user requiring a particular subprogram, the manufacturer can mass produce the ROM package 10 for each subprogram and thereby benefit from the reduced costs associated with mass production.

Figure 3:
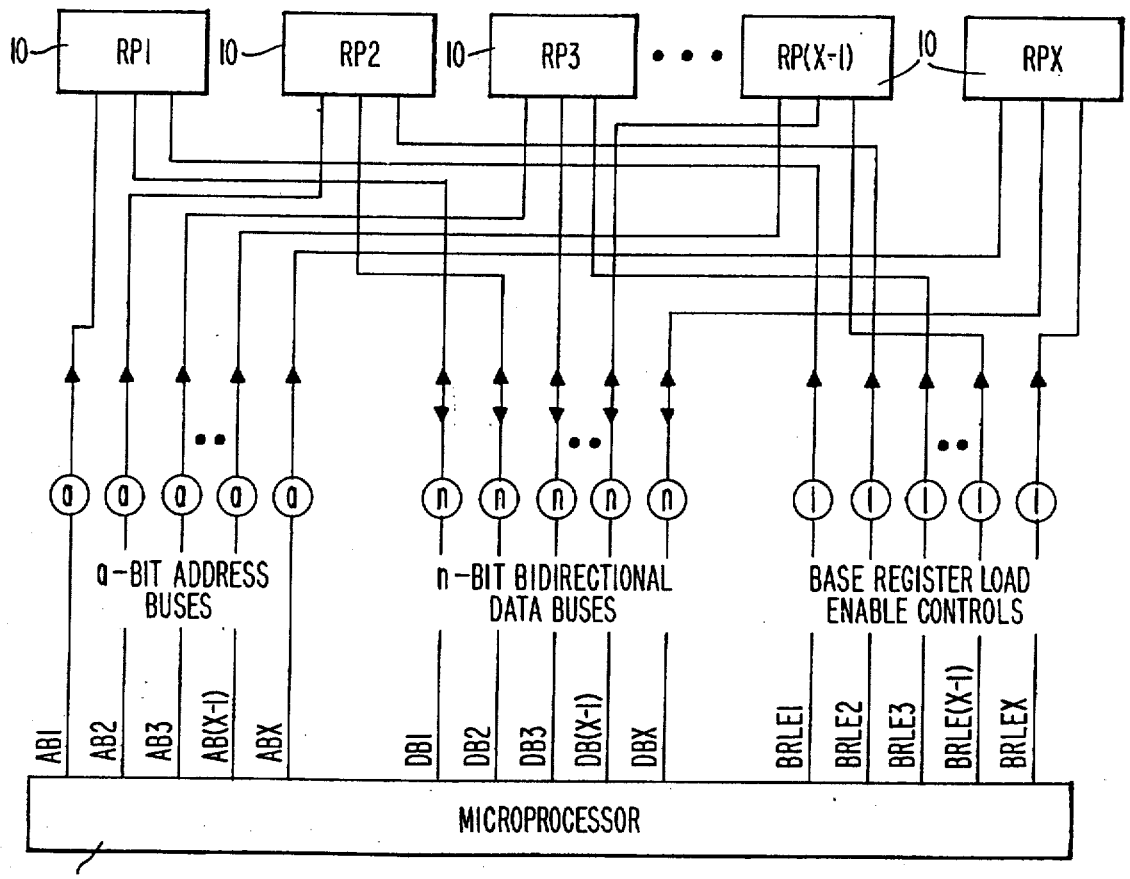
FIG. 3 is a block diagram of the present invention including multiple ROM packages attached to the same microprocessor.

FIG. 3 illustrates an alternate embodiment of the present invention including a memory system comprising X ROM packages 10 (RP1–RPX), each of which contains a different subprogram. In such an embodiment, the microprocessor 22 determines which ROM package 10 contains the actual storage location corresponding to the memory system address. Thus, for example, the microprocessor may use the first four bits of the n-bit memory system address to determine which ROM package 10 contains the memory system address to be accessed. The microprocessor 22 logic to implement this function is well known in the prior art.

The microprocessor 22 is connected to each of the ROM packages RP1-RPX by individual a-bit address buses (AB1-ABX), n-bit bidirectional data buses (DB1-DBX) and base register load enable control lines (BRLE1-BRLEX), respectively. However, those skilled in the art will realize that alternate embodiments may utilize a single address bus and a single data bus connected to all of the ROM packages RP1-RPX. Each ROM package (RP1-RPX includes all of the hardware illustrated in dotted lines in FIG. 2 and is used to contain one subprogram written assuming it is located at the same starting memory system address, typically address zero. The operating system program is aware of the actual starting memory system address of each ROM package RP1-RPX.

When the system is powered on, the operating system program is put in control and loads the base register 14 in each ROM package RP1-RPX with an offset value equal to the memory system address corresponding to the first location of the subprogram contained in the respective ROM package RP1-RPX. This is accomplished by the microprocessor transmitting the offset value for a particular ROM package RP1-RPX on that ROM package's n-bit bidirectional data bus DB1-DBX, and activating that ROM package's base register load enable line BRLE1-BRLEX, respectively.

Once each ROM package base register 14 is loaded, the operating system program need only know the actual entry point memory system address of a ROM package RP1-RPX in order to use the subprogram stored in that ROM package. Subsequently, read operations directed to any ROM package RP1-RPX will cause the address portion of data read from the ROM 12 to be offset by the contents of the base register 14 in the corresponding ROM package 10 since each storage location in the ROM 12 referring to an address within its subprogram will have its associated base register select bit on.

The latter described embodiment allows a manufacturer to offer a user a catalog of standard subprograms in ROM package form. The user is free to choose those subprogram ROM packages he requires and locate them at any available memory system address space. Only minimal customizing of the operating system program is required to initialize the base registers and the benefits of being able to purchase debugged, mass-produced subprograms greatly compensate for the operating system program overhead required.

Having shown and described both the preferred and an alternate embodiment of the present invention, those skilled in the art will realize that various omissions, substitutions and changes in forms and details of the present invention may be made without departing from the spirit of the invention. For example, one of the address bits or a specified combination of address bits may be utilized in place of the base register load enable signals to activate the loading of a base register. It is the intention, therefore, to be limited only as indicated by the scope of the following claims.

What is claimed is:

1. An external memory device for processing data to be transmitted to a using device, comprising:
   an addressable memory having an output and containing addressable storage locations;
   a base register, said base register including a read/write storage memory and means for writing a pattern of data in said read/write storage memory;
   gating means connected to the output of said base register and a first subset of the set of output bit positions of said addressable memory, said gating means responsive to selected data patterns from the first subset of said set of output bit positions of said addressable memory, said gating means for selectively gating the contents of said base register to the output of said gating means;
   an adder having two inputs and an output, the inputs to said adder connected to a second subset of the set of output bit positions of said addressable memory and the output of said gating means respectively, the output of said adder for supplying processed data to said using device; and
   output control means, responsive to the writing of data in said base register, said output control means for turning off the output of said adder.

2. The external memory device in accordance with claim 1 wherein said addressable memory is a read only memory.

3. The external memory device in accordance with claim 2 wherein said base register is further characterized as a static memory with a latched output.

* * * * *